J. PERRY.
WIND POWER MACHINE.
APPLICATION FILED JUNE 16, 1908.
923,698.
Patented June 1, 1909.
2 SHEETS—SHEET 1.
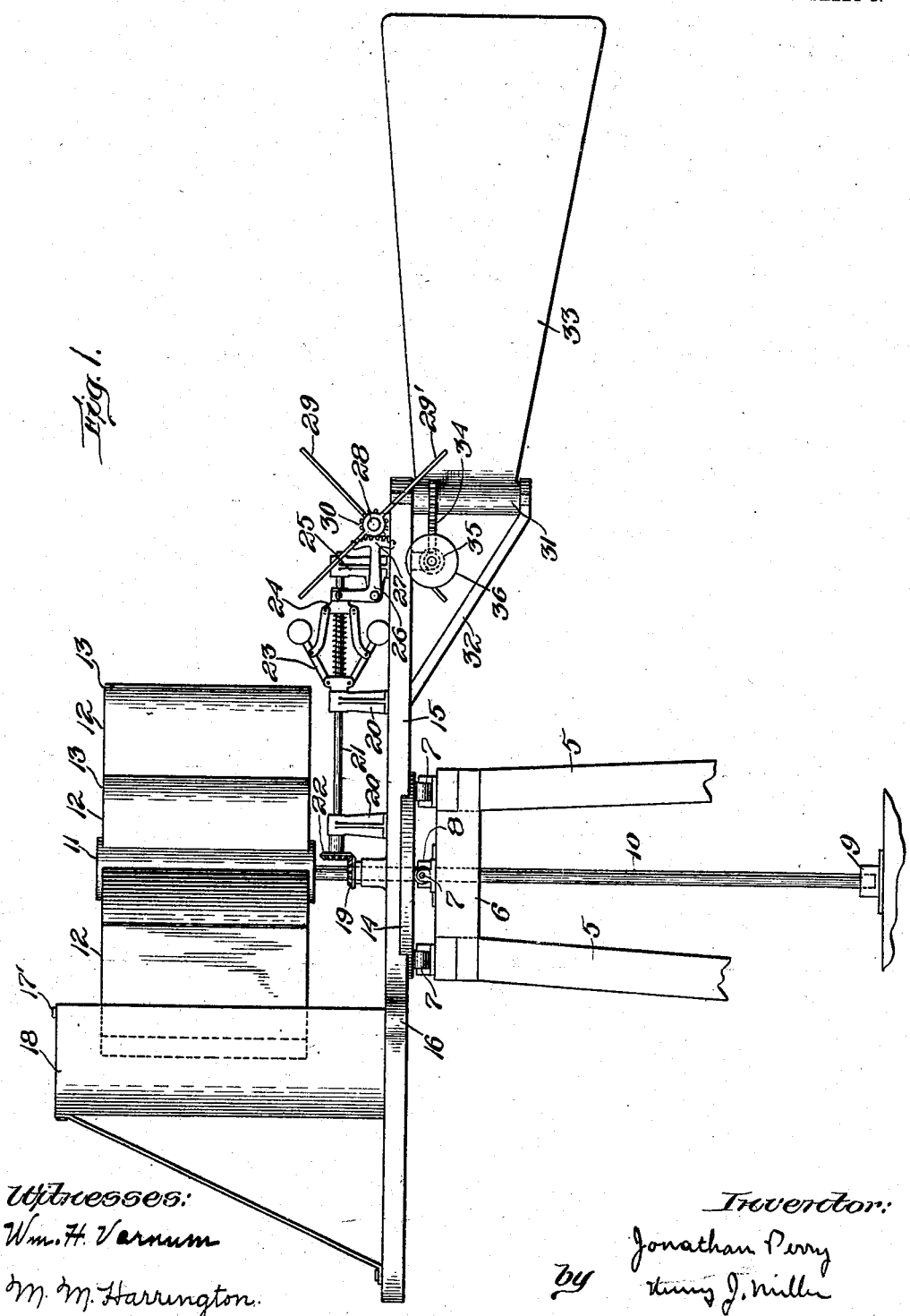
Witnesses:
Wm. H. Varnum
M. M. Harrington.
Inventor:
Jonathan Perry
by Henry J. Miller
Atty.

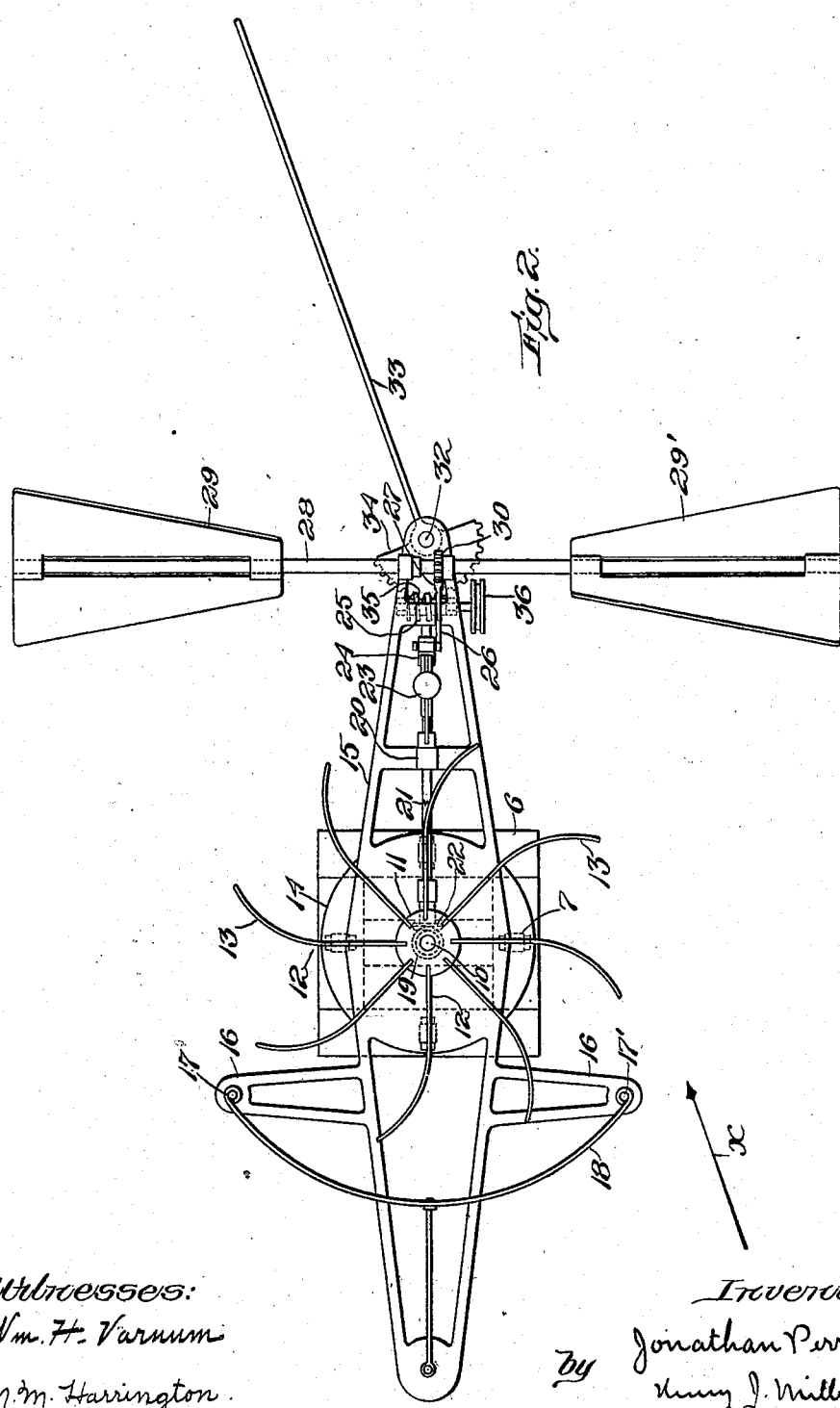

UNITED STATES PATENT OFFICE.

JONATHAN PERRY, OF CAMBRIDGE, MASSACHUSETTS.

WIND-POWER MACHINE.

No. 923,698.          Specification of Letters Patent.          Patented June 1, 1909.

Application filed June 16, 1908. Serial No. 438,763.

*To all whom it may concern:*

Be it known that I, JONATHAN PERRY, of Cambridge, in the county of Middlesex and State of Massachusetts, have invented certain new and useful Improvements in Wind-Power Machines; and I hereby declare that the following is a full, clear, and exact description of the same, reference being had to the accompanying drawings, forming part of this specification.

This invention has reference to improvements in wind power machines in the nature of wind mills.

One object of the invention is to so construct a wind power machine that the wind driven element may be operated at a high speed.

Another object of the invention is to so construct a wind power machine that the wind may be cut off at times from action on the wind driven element.

Another object of the invention is to so construct a wind power machine furnished with a vertical fan shaft and a wind deflector that the position may be automatically changed with the changing direction of the wind.

Another object of the invention is to automatically control the speed of wind power machines of the nature herein described.

Other objects of the invention will appear from the following description.

The invention consists in the peculiar features of construction and combination of parts which will hereinafter be more fully described and pointed out in the claims.

Figure 1, represents a side elevation of the improved wind power machine, parts of the power shaft and the supporting pedestal being broken away. Fig. 2, represents a plan view of the same.

Similar characters of reference designate corresponding parts in both figures.

As carried into practice, in its preferred form, 5—5 indicate the uprights of a pedestal or tower of any ordinary construction having the top 6 furnished with the roller bearings 7—7 and the bearing 8. Journaled in the bearing 8 and, preferably in the step bearing 9, located at a distance below said bearing 8, is the power shaft 10 having the hub 11 furnished with the radially extending vertical blades 12—12 having the curved ends 13—13. Journaled on the shaft 10 is the circular bearing member 14, which is supported by and is free to rotate on the roller bearings 7—7, and on this bearing member is mounted the frame 15 having the laterally extending arms 16—16 carrying vertical rods 17—17' to which the ends of the curved deflector plate 18 are secured, said deflector being otherwise suitably supported and braced.

The vertical shaft 10 is furnished, below the fan or wind driven element, with the bevel pinion 19 and in bearings 20—20 of the frame 15 is journaled the governor shaft 21 having the bevel pinion 22 meshing with the pinion 19 and the ball governing-mechanism 23, of any usual construction, furnished with the sleeve 24 slidably mounted on said shaft 21. Near the rear end of the frame 15 is mounted the bracket 25, in which is journaled the shaft 21, and on this bracket is pivotally supported the crank 26 having one end pivotally connected with said sleeve 24 and having the other of its arms furnished with the segmental rack 27.

In bearings at the rear end of the frame 15 is journaled the transverse shaft 28 having blades 29—29' of suitable size and shape, and the pinion 30 which is preferably engaged by and operated through the medium of the rack 27. At the extreme rear portion of the frame 15 is mounted the pendent vertical shaft 31, braced at its lower end by the frame member 32, and on this shaft 31 is mounted to swing the vane 33 having the segmental rack 34 which meshes with the worm 35 journaled in bearings beneath the frame 15 and having the wheel 36 adapted to be rotated by any ordinary means or in any suitable manner to rotate said worm 35 and thus effect the adjustment of the vane 33 as experience will demonstrate to hold the frame 15, at a suitable angle, toward the direction of the wind which supposed direction of the wind is approximately indicated by the arrow X in Fig. 2.

Currents of wind passing across that edge of the wind shield 18 indicated by the post 17' in Fig. 2 of the drawings will act against the rearwardly curved edges 13 of the blades 12 and effect the rotative propulsion of the fan formed by said blades and the journaled shaft 10 on which said fan is mounted. As the curved ends of theses blades 12—12 pass the median line of the frame 15, indicated by shaft 21, the wind is spilled therefrom and no reaction of the wind against the forward surfaces of the succeeding blades is possible while, as such median line is passed, and said blades move around again toward the post 17', said blades are cut off by the deflector or wind shield 18 until as they approach a point opposite said post 17' they are brought under the drawing influence of the vacuum created by the wind passing this edge of the wind shield and are immediately thereafter subjected to the force of the wind.

Under the undue speed of the shaft 10 the governor 23 will be operated to effect the swinging of the lever 26 which through its rack 27 and the pinion 28 will cause the rotation of the shaft 28 and the turning the sides of one of the blades 29 or 29' into the wind and the surface of the other of said blades against the wind whereupon the front end frame 15 will be swung more into the wind and the shield 18 will cut off the wind from the wind driven element represented by the blades 12—12 and their hub.

Having thus described my invention I claim as new and desire to secure by Letters Patent:

1. A wind power machine comprising a fan mounted to rotate about a vertical axis, a frame mounted to swing about said axis and having a wind shield, wind actuated means movably mounted with relation to said wind shield and in operative relation thereto to move said shield, and mechanism connecting said fan and said shield moving means whereby such shield moving means may be actuated by said fan at times.

2. A wind power machine comprising a pedestal, a fan having a vertical axis rotatably supported thereby, a frame mounted on said pedestal to rotate about said fan, a wind shield at one end portion of said frame, a transverse shaft journaled in bearings of said frame and having blades, a governor in operative connection with said fan, and means actuated through said governor for effecting the rotation of said transverse shaft.

3. A wind power machine comprising a pedestal, a vertical shaft journaled therein, a hub mounted on said shaft and having radially extending blades with curved ends, a frame mounted to swing about said shaft and having a curved wind shield at one end and a pivoted vane at the other end, a transverse shaft journaled in bearings on said frame and having blades disposed at different angles, and a governing connection between said vertical shaft and said transverse shaft as and for the purpose described.

JONATHAN PERRY.

Witnesses:
CHAS. H. PYNE,
H. J. MILLER.